(12) United States Patent
Barnes et al.

(10) Patent No.: US 10,267,003 B2
(45) Date of Patent: Apr. 23, 2019

(54) PILE GUIDE

(71) Applicants: Sean A. Barnes, Mt. Pleasant, SC (US); Neal Black, Goose Creek, SC (US)

(72) Inventors: Sean A. Barnes, Mt. Pleasant, SC (US); Neal Black, Goose Creek, SC (US)

( * ) Notice: Subject to any disclaimer, the term of this patent is extended or adjusted under 35 U.S.C. 154(b) by 5 days.

(21) Appl. No.: 15/458,590

(22) Filed: Mar. 14, 2017

(65) Prior Publication Data

US 2018/0266066 A1    Sep. 20, 2018

(51) Int. Cl.
*E02B 3/06* (2006.01)

(52) U.S. Cl.
CPC .............. *E02B 3/064* (2013.01); *Y02A 10/18* (2018.01)

(58) Field of Classification Search
CPC ........................................ E02B 3/064
USPC .................................. 405/218, 221
See application file for complete search history.

(56) References Cited

U.S. PATENT DOCUMENTS

| | | | | |
|---|---|---|---|---|
| 2,857,872 A * | 10/1958 | Usab | ...................... | E02B 3/064 114/266 |
| 3,074,239 A * | 1/1963 | Mustard | ................... | E02B 3/068 14/2.4 |
| 3,287,919 A * | 11/1966 | Hahn | ...................... | E02B 3/064 405/218 |
| 4,260,293 A * | 4/1981 | Peterson | ................. | E02B 3/064 114/267 |
| 4,352,597 A * | 10/1982 | Kay | ........................ | E02B 3/068 114/263 |
| 4,773,346 A * | 9/1988 | Blanding | .................. | E02C 5/00 114/45 |
| 5,046,897 A * | 9/1991 | Ray | ........................ | E02B 3/068 405/221 |
| 6,145,463 A * | 11/2000 | Zeilinger | .................. | B63B 3/06 114/267 |
| 6,179,525 B1 * | 1/2001 | Gruhn | ...................... | B63B 3/08 114/263 |
| 6,558,083 B1 * | 5/2003 | Quandt | ................... | E02B 3/068 114/44 |
| D506,668 S | 6/2005 | Black | | |
| 6,994,493 B2 * | 2/2006 | Jones | ...................... | E02D 13/04 405/227 |
| 7,153,064 B2 * | 12/2006 | Zeilinger | ................ | E02B 3/064 114/263 |
| 7,390,141 B2 * | 6/2008 | Rytand | ...................... | E02B 3/06 405/104 |
| 7,406,924 B1 * | 8/2008 | Impey | ..................... | E02B 3/068 114/263 |
| 9,487,925 B1 | 11/2016 | Meriwether et al. | | |

(Continued)

OTHER PUBLICATIONS

Performance Pipe; Driscopipe 8100 series polyethylene piping (Year: 2006).*

(Continued)

*Primary Examiner* — Benjamin F Fiorello
(74) *Attorney, Agent, or Firm* — B. Craig Killough; Barnwell Whaley Patterson & Helms, LLC

(57) ABSTRACT

A pile guide having a planar flange. The planar flange is connected to a collar. The collar is constructed and arranged to receive a pile through an opening in the collar. The collar extends above and below the planar flange, and is formed of high density polyethylene.

16 Claims, 8 Drawing Sheets

(56) References Cited

U.S. PATENT DOCUMENTS

| | | | | |
|---|---|---|---|---|
| 2005/0002741 A1* | 1/2005 | Brensinger | ............... | E02B 3/20 |
| | | | | 405/231 |
| 2005/0271477 A1* | 12/2005 | Sehl | ........................ | B63B 21/00 |
| | | | | 405/218 |
| 2007/0248420 A1* | 10/2007 | Jacobs | ..................... | E02B 3/068 |
| | | | | 405/218 |
| 2008/0014028 A1* | 1/2008 | Faires | ..................... | E02D 27/16 |
| | | | | 405/230 |
| 2011/0274502 A1 | 11/2011 | Tibedo et al. | | |

OTHER PUBLICATIONS

Boat Lift and Dock; Aluminum Base Pad; 2014 (Year: 2014).*
CanDock; Modular Floating Dock System; Jan. 2016 (Year: 2016).*
Watermark Marine Supply. Base Pipe; 2015 (Year: 2015).*
Carolina Waterworks Inc; HDPE Pile Glide; May 2016 (Year: 2016).*

* cited by examiner

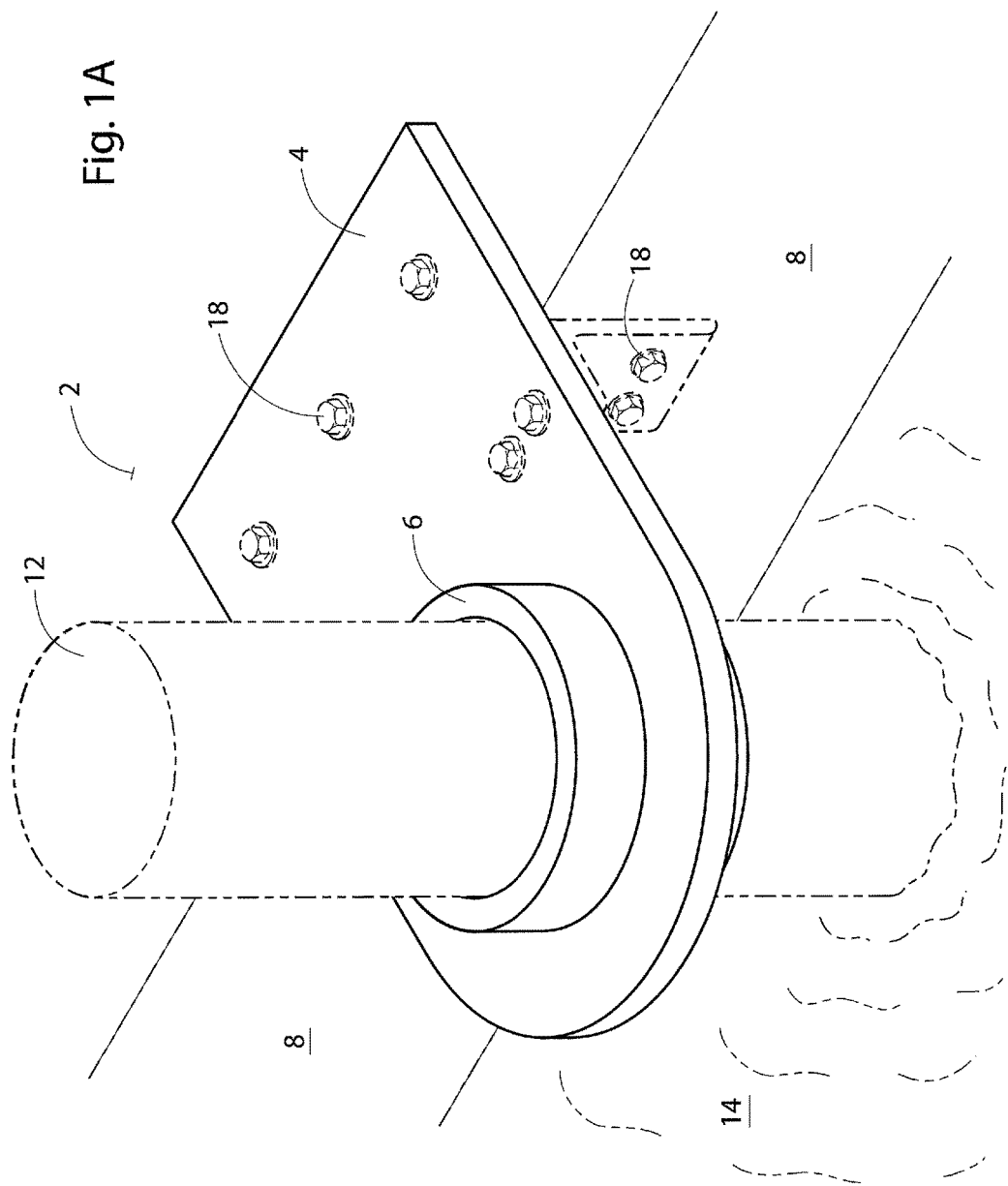

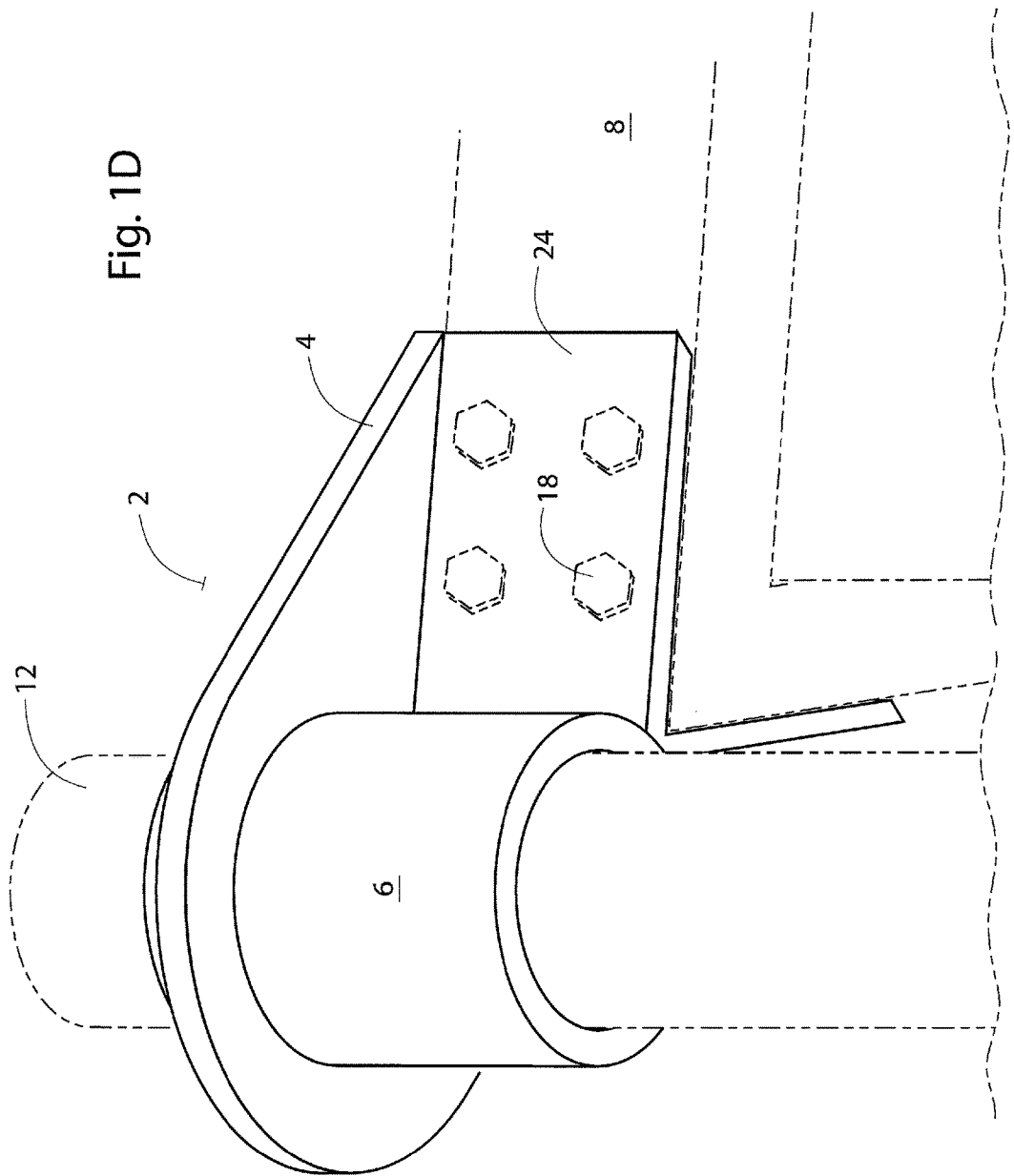

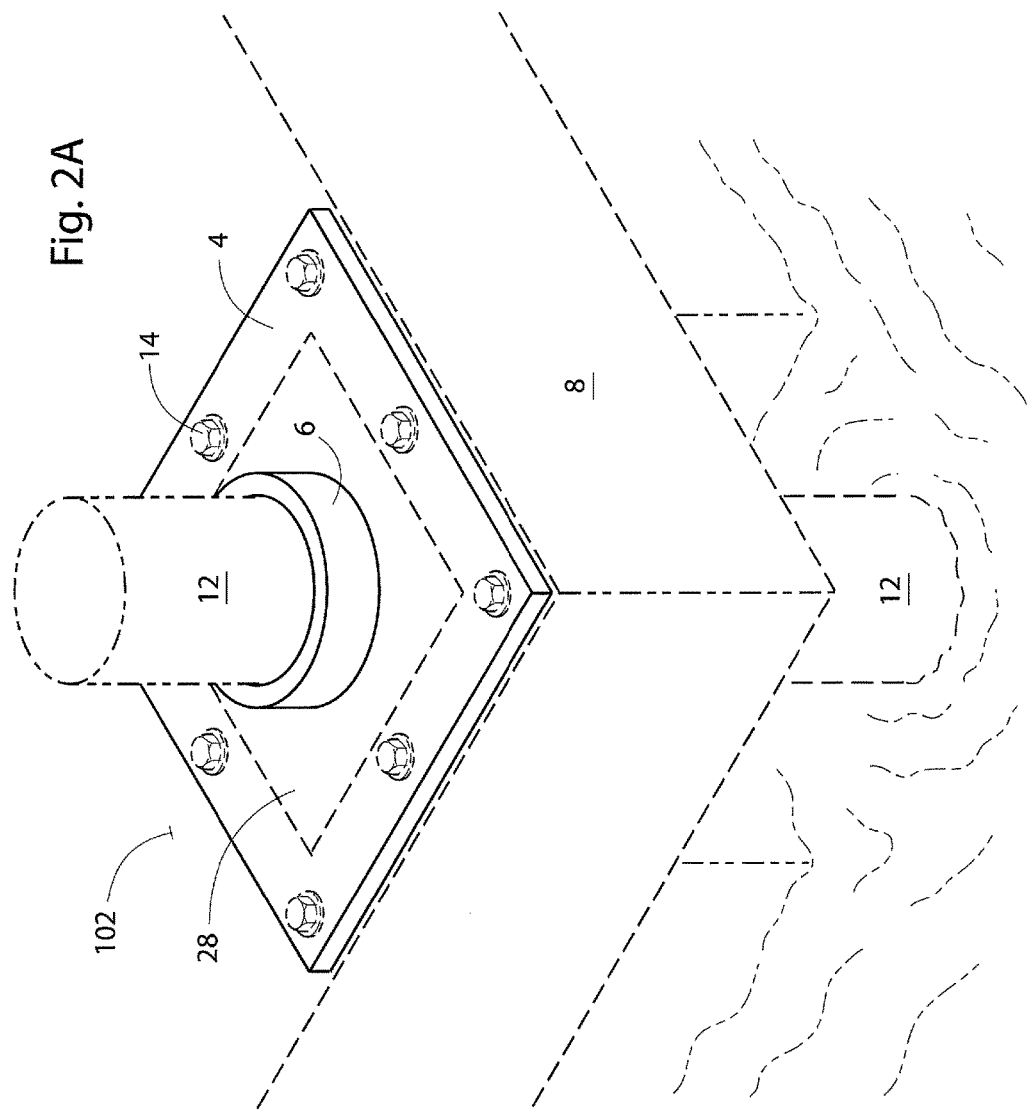

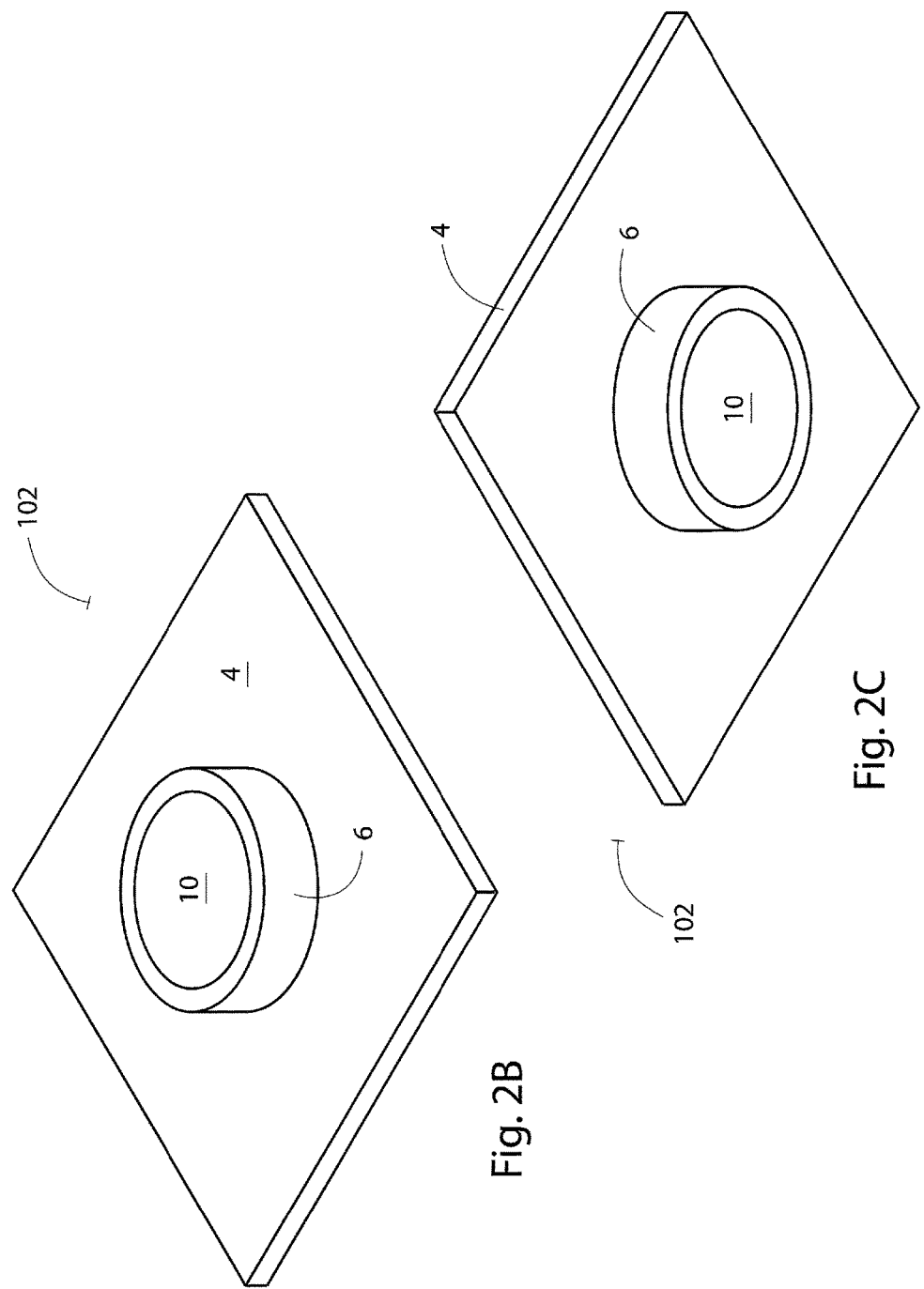

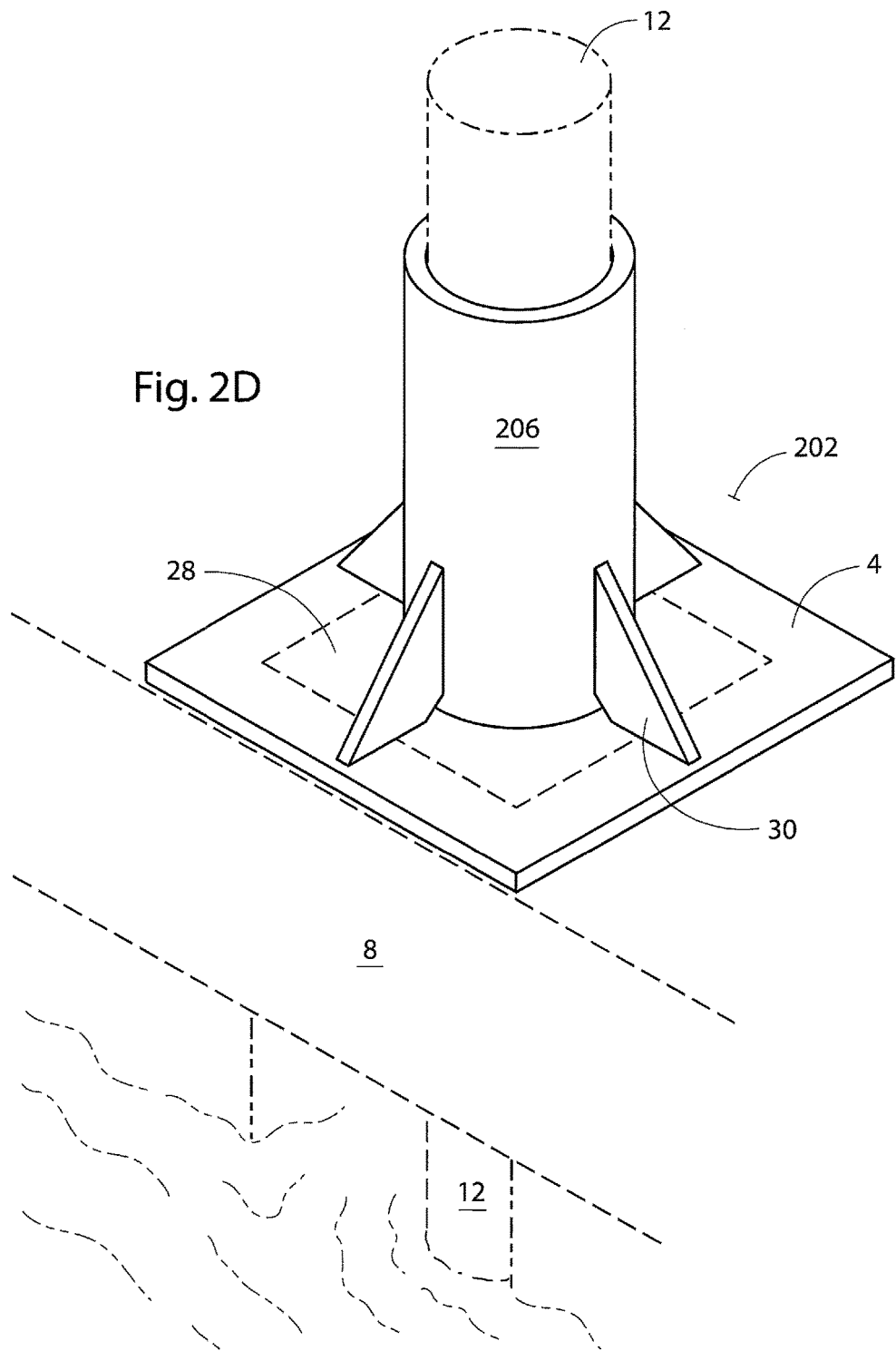

under the foregoing conditions.

PILE GUIDE

FIELD OF THE INVENTION

This invention relates to floating docks generally, and is more specifically related to devices and methods for connecting floating docks to stabilizing piles.

BACKGROUND OF THE INVENTION

Floating docks are designed to float in water as water levels rise and fall. Floating docks are useful in areas where tides are experienced, and in areas where water levels vary due to such factors as weather, flood control, or hydroelectric generation.

The horizontal position of a floating dock is typically held in place by piles that are driven into the earth. The dock is connected to the piles by pile guides, which permit vertical movement of the dock as water rises and falls, but prevent substantial horizontal movement of the dock.

Pile guides in common use have inadequate service lives. Most pile guides in common use are formed of metal. Metal pile guides are not sufficiently resistant to environmental factors such as weather and sunlight. Particularly in salt water applications, corrosion of metals, even galvanized metals leads to replacement of the pile guides.

SUMMARY OF THE INVENTION

The present invention is a pile guide having a planar flange. The planar flange is connected to a collar. The collar is constructed and arranged to receive a pile through an opening in the collar. The collar extends above and below the planar flange, and is formed of high density polyethylene.

BRIEF DRAWING DESCRIPTION

FIG. 1A is a perspective view of a pile guide mounted to a floating dock, with a collar holding a pile within an opening of the collar.

FIG. 1D shows a pile guide with a V-shaped member extending from a bottom of the pile guide, with the pile guide mounted to a corner of a floating dock.

FIG. 2A shows a perspective view of an internal pile guide mounted to a dock.

FIG. 2B is a top perspective view of a pile guide of FIG. 2A.

FIG. 2C is a bottom perspective view of a pile guide of FIG. 2A.

FIG. 2D shows another embodiment of an internal pile guide mounted to a floating dock with a collar holding a pile within an opening of the collar.

DESCRIPTION OF PREFERRED EMBODIMENTS

Figure 1B:
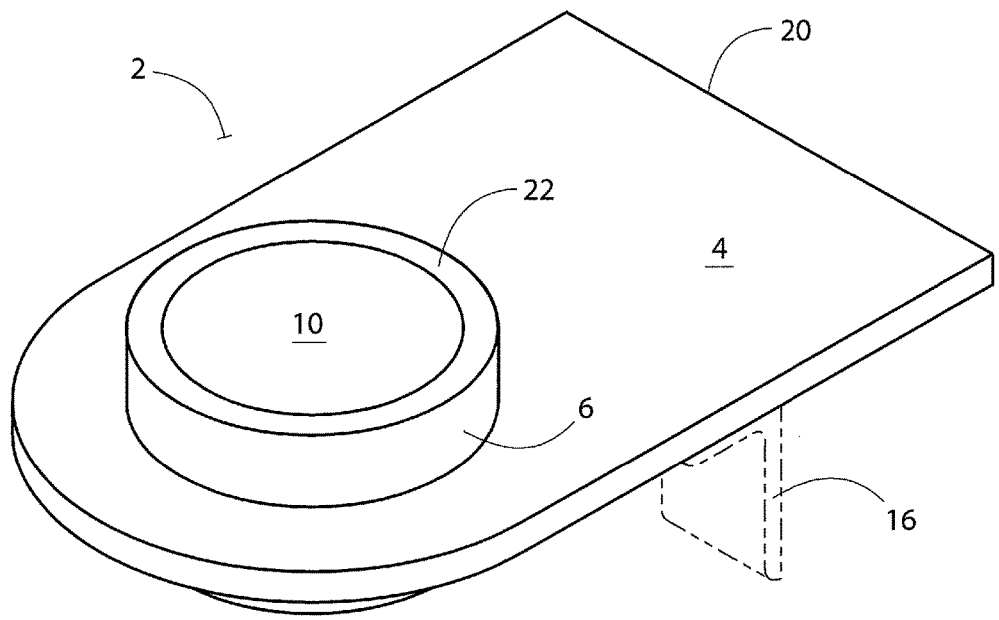
FIG. 1B is a top perspective view of the pile guide of FIG. 1A.

FIG. 1A shows a pile guide 2 according to the invention mounted to a side of a dock. The pile guide comprises a planar flange 4. The planar flange has a collar 6 positioned or formed therein. The collar has an opening 10 that is constructed and arranged to receive a pile 12 that is driven into the earth and below the water 14. The pile extends through the opening in the collar and sufficiently above the opening in the collar so that the pile is positioned within the collar at the highest anticipated water levels to which the dock 8 is subjected.

Figure 1C:
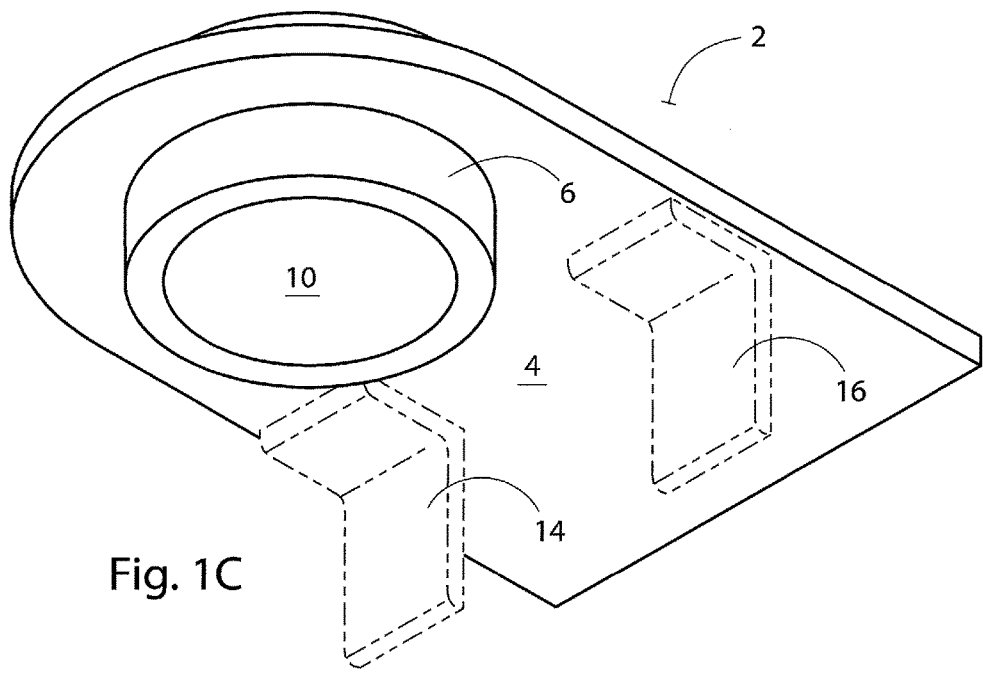
FIG. 1C is a bottom perspective view of the pile guide of FIG. 1A.
Figure 1F:
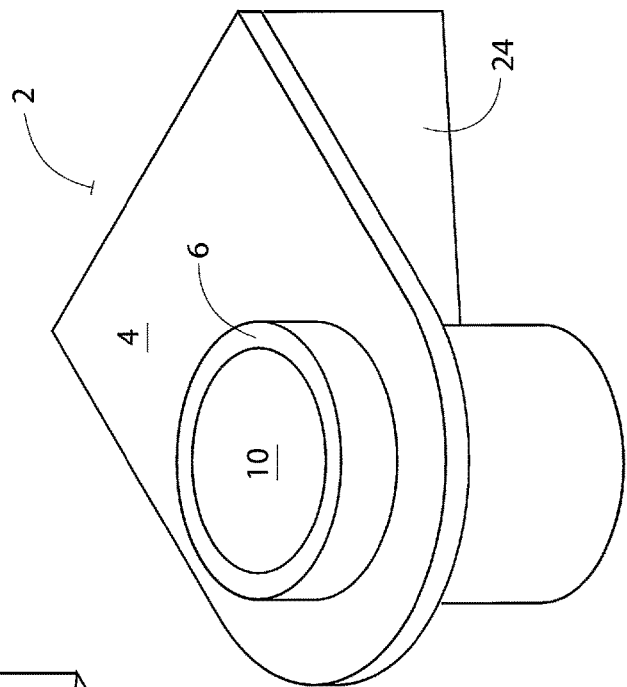
FIG. 1F shows a top perspective view of the pile guide of FIG. 1B.

The collar extends above a top surface of the planar flange and below the bottom surface of the planar flange as shown in FIG. 1B and FIG. 1C. The planar flange may be mounted to the dock by a leg or legs 14, 16 that extend from a bottom surface of the planar flange at generally a right angle. The planar flange may be mounted to the dock by forming holes in the planar flange and mounting the planar flange to the leg into the dock with nuts and bolts 18.

In a preferred embodiment, one side of the planar flange extends a sufficient distance from the collar to provide selectivity in mounting the flange to the dock. For example, some docks may be a greater distance from the pile to which they are to be connected than are other docks. A flange having a longer side of the flange provides selectivity in mounting so that the pile guide is substantially universal for most docks in use regardless of the distance of the dock to the pile. Stated otherwise, a rear edge 20 of the elongated, or longer, side of the planar flange extends not less than 5.0 centimeters from the nearest point 22 of the rear edge to the collar. The longer side of the planar flange may be longer depending on the application. A pile guide having a larger diameter collar will typically have a longer side of greater length.

Figure 1E:
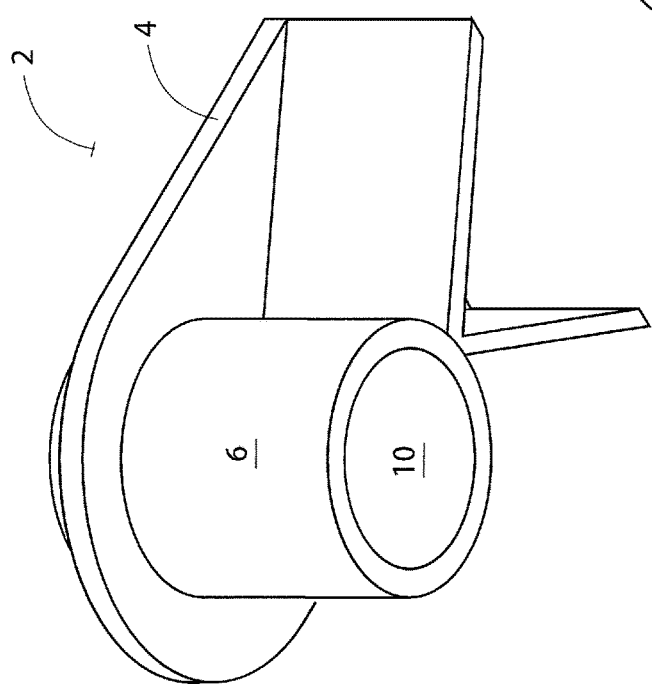
FIG. 1E shows a bottom perspective view of the pile guide of FIG. 1B.

The pile guide as shown in FIGS. 1A-1C may be mounted about the perimeter of floating dock, including the corners of the dock. To assist in alignment, when mounted on a corner of a dock having a right angle, the embodiment of the pile guide as shown in FIG. 1D may be used. In this embodiment, a V-shaped member 24 extends from a lower surface of the pile guide. In most applications, the V-shaped member will have a first leg and a second leg that join each other at substantially a right angle. The V-shaped member of the pile guide as shown extends generally vertically from the bottom of a pile guide as more particularly shown in FIG. 1E. This embodiment of the pile guide may be mounted to the dock using fasteners such as nuts and bolts 18.

Figure 2E:
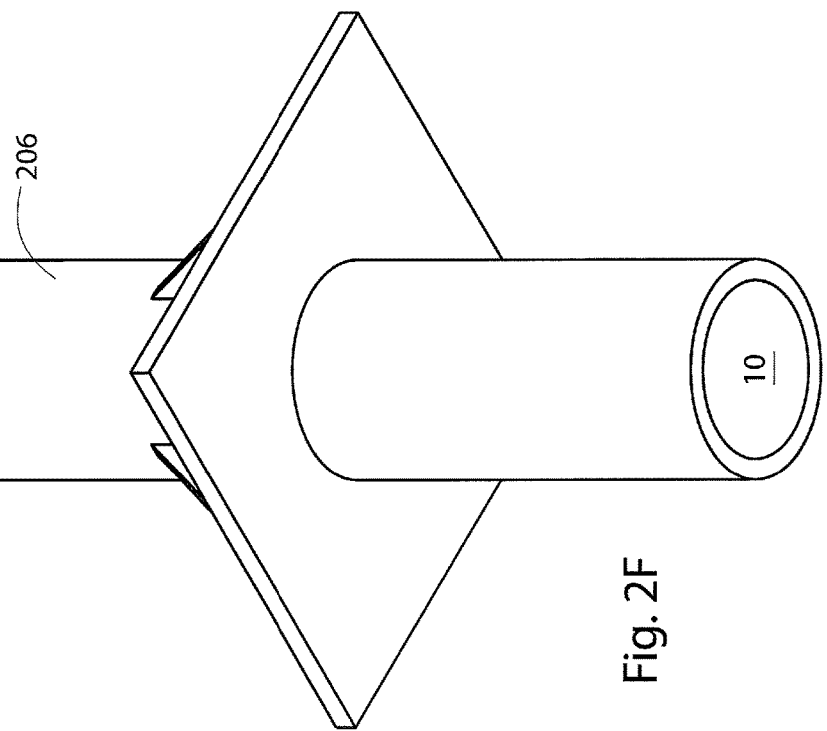
FIG. 2E is a top perspective view of the pile guide according to FIG. 2D.
Figure 2F:
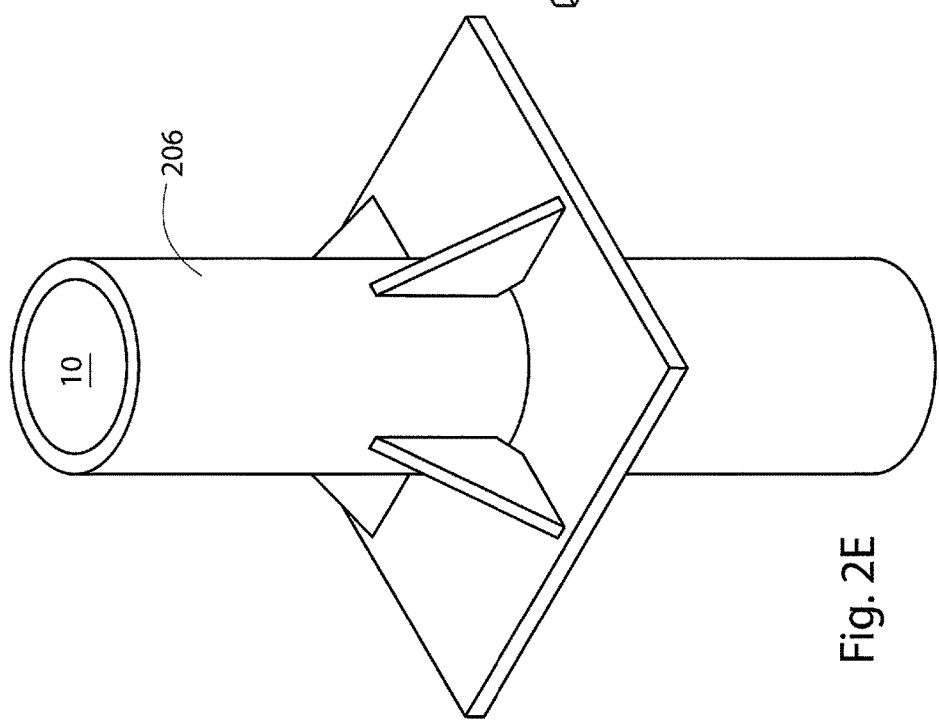
FIG. 2F is a bottom perspective view of the pile guide according to FIG. 2D.

FIG. 2A demonstrates a pile guide 102 that is mounted internally, that is, within the perimeter of the dock 8. The dock in this application has a hole formed in it through which the pile 12 extends. The pile guide is mounted over the hole or void 28 in the dock, with the pile extending through the pile guide collar 6. The pile guide in this embodiment has a planar flange 4 which surrounds the collar. The collar extends above and below the flange as shown in FIG. 2B and FIG. 2C. The pile guide may be mounted to the dock using nuts and bolts 14. The collar is constructed and arranged to receive the pile guide in the opening 10.

FIG. 2D shows an additional embodiment of a pile guide 202 mounted to a dock. This embodiment is similar to the embodiment in FIG. 2A, excepting that the collar 206 is of additional length for added strength and stability in applications where substantial force is applied due to the size of the dock and/or vessels, as well as weather and tides. The planar flange 4 surrounds the collar, which is constructed and arranged to receive a pile 12 through the opening 10 in the collar. Gussets 30 may be formed that connect the planar flange to the collar on a top surface of the flange to provide greater strength. This pile guide is also an internal pile guide, that is, it is used within the perimeter of the floating dock 8.

In every embodiment disclosed herein, the pile guide is formed of high density polyethylene (HDPE), which is material to the invention. High density polyethylene is extremely strong and can withstand substantial impact. Floating docks and pile guides used with them are subject to impact from boats and other objects. High density polyethylene is also abrasion resistant. Importantly, high density polyethylene exhibits a low coefficient friction; therefore, the collar of the device glides easily relative to the pile, whether the pile is constructed of wood, concrete or other materials. This feature is particularly important for applications wherein the associated floating dock is subject to frequent tidal changes approaching two (2) meters or more. Further, because high density polyethylene is abrasion resistant, the collar is not subject to substantial wear over time as the pile moves within the opening to the collar.

High density polyethylene can also be formed to be resistant to ultraviolet (UV) light such as sunlight. The addition of carbon black to high density polyethylene provides UV stability. Further, UV absorbers and light stabilizers (HALS) either alone or in combination with each other, and/or in combination with carbon black, may be added to the high density polyethylene to improve UV resistance and reduce UV deterioration.

The planar flange 4 may be formed from a sheet of high density polyethylene. High density polyethylene may be cut or formed to the shapes shown in the drawing figures to form the planar flange. A hole or void may be cut or formed in the high density polyethylene. Extruded high density polyethylene pipe may be cut to form the collar 6, 206. The collar may be welded in the hole or void of the planar flange to form the pile guides shown in the drawings. In another embodiment, the pile guide embodiments are formed by molding or by 3D printing.

While the collar as shown in the drawings is cylindrical, it is not necessary that the collar have the circular cross section of a cylinder. The collar of the pile guide may be formed in other geometric shapes, such as rectangles or squares. The shape of the collar of the pile guide will typically depend upon the geometric shape of the cross section the pile on which it is mounted.

What is claimed is:

1. A pile guide comprising a flange and a collar, wherein the collar has an opening therein so constructed and arranged to receive a fixed pile through the opening of the collar, the collar positioned within and surrounded by the flange, the flange extending outwardly from sides of the collar, wherein the collar and the flange are formed as separate parts, and wherein the collar is held in a void formed in the flange by a weld, and wherein the pile guide comprising the flange and the collar is formed entirely of high density polyethylene.

2. A pile guide as described in claim 1, wherein an elongated side of the flange extends not less than 5.0 cm from a nearest point of a rear edge of the flange to the collar.

3. A pile guide as described in claim 1, wherein the pile guide is formed entirely of UV stabilized high density polyethylene.

4. A pile guide as described in claim 1, wherein the pile guide is formed entirely of high density polyethylene, and the high density polyethylene comprises carbon black.

5. A pile guide as described in claim 1, wherein the flange completely surrounds the collar.

6. A pile guide as described in claim 1, wherein the collar is annular.

7. A pile guide as described in claim 1, wherein the collar is circular.

8. A pile guide as described in claim 1, wherein the flange comprises a leg extending at generally a right angle and from a bottom surface of the flange, and wherein the leg is constructed and arranged to abut a boat dock.

9. A pile guide as described in claim 1, wherein the flange comprises a V-shaped member extending from a bottom surface of the flange, and wherein the V-shaped member extends vertically and is so constructed and arranged to receive a vertical corner of a boat dock between each leg of the V-shaped member.

10. A pile guide as described in claim 1, wherein the flange comprises a V-shaped member extending from a bottom surface of the flange, wherein the V-shaped member is formed by a first leg that joins a second leg at substantially a right angle and wherein the V-shaped member extends vertically and is so constructed and arranged to receive a vertical corner of a boat dock between the first leg and the second leg of the V-shaped member.

11. A pile guide as described in claim 1, wherein the pile guide is formed entirely of UV stabilized high density polyethylene, and wherein a UV stabilizer for the HDPE is chosen from a group consisting of carbon black, ultraviolet absorbers and light stabilizers.

12. A pile guide as described in claim 1, further comprising a plurality of gussets extending upwardly from a top surface of the flange and connecting with a portion of the collar that extends above the flange.

13. A pile guide as described in claim 1, wherein the flange does not extend above a top surface of the collar or below a bottom surface of the collar, and wherein the flange has a flat horizontal surface so constructed and arranged to mount to a horizontal surface of a boat dock.

14. A pile guide comprising a flange and a collar, wherein the collar has an opening therein so constructed and arranged to receive a fixed pile through the opening of the collar, the collar positioned within and surrounded by the flange, the flange extending outwardly from sides of the collar, wherein the pile guide comprising the flange and the collar is formed entirely of high density polyethylene, and further comprising a leg extending at generally a right angle and from a bottom surface of the flange and wherein the leg is constructed and arranged to abut a boat dock.

15. A pile guide comprising a flange and a collar, wherein the collar has an opening therein so constructed and arranged to receive a fixed pile through the opening of the collar, the collar positioned within and surrounded by the flange, the flange extending outwardly from sides of the collar, wherein the pile guide comprising the flange and the collar is formed entirely of high density polyethylene, and further comprising a V-shaped member extending from a bottom surface of the flange, and wherein the V-shaped member extends vertically and is constructed and arranged to receive a vertical corner of a boat dock between each leg of the V-shaped member.

16. A pile guide as described in claim 15, wherein the V-shaped member is formed by a first leg that joins a second leg at substantially a right angle.

* * * * *